(12) United States Patent
Chen et al.

(10) Patent No.: US 9,250,986 B2
(45) Date of Patent: Feb. 2, 2016

(54) METHOD AND APPARATUS FOR DATA LINKAGE BETWEEN HETEROGENEOUS PLATFORMS

(71) Applicant: Neusoft Corporation, Shenyang (CN)

(72) Inventors: Jingxiang Chen, Shenyang (CN); Jie Lu, Shenyang (CN); Shuyi Wang, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 21 days.

(21) Appl. No.: 13/945,927

(22) Filed: Jul. 19, 2013

(65) Prior Publication Data

US 2014/0068637 A1 Mar. 6, 2014

(30) Foreign Application Priority Data

Sep. 3, 2012 (CN) .......................... 2012 1 0322432

(51) Int. Cl.
*G06F 9/54* (2006.01)
*G06F 9/52* (2006.01)

(52) U.S. Cl.
CPC . *G06F 9/542* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 2006/0004912 A1* | 1/2006 | Najam et al. | 709/213 |
| 2010/0274550 A1 | 10/2010 | Chou | |
| 2011/0087928 A1* | 4/2011 | Daud et al. | 714/42 |
| 2011/0287764 A1* | 11/2011 | Zitnik | 455/433 |
| 2012/0179801 A1* | 7/2012 | Luna et al. | 709/223 |
| 2012/0290797 A1* | 11/2012 | Rodriguez | 711/151 |
| 2013/0046826 A1* | 2/2013 | Stanton | 709/204 |

FOREIGN PATENT DOCUMENTS

| | | | |
|---|---|---|---|
| CN | 101551761 A | 10/2009 | |
| CN | 102360313 A | 2/2012 | |
| CN | 102508712 A | 6/2012 | |

OTHER PUBLICATIONS

Chinese Office Action.
Chinese Office Action dated Mar. 9, 2015.

* cited by examiner

*Primary Examiner* — Tuan Dao (74) *Attorney, Agent, or Firm* — Brundidge & Stanger, P.C.

(57) ABSTRACT

The present invention provides a method for data linkage driven by an event, used for data interaction between a first platform and a second platform. The second platform stores shared information and the method comprises: determining which platform the received event is from; forwarding a data packet from the second platform to the first platform for logical operation processing when the received event is from the second platform; when the received event is information from the first platform that at least includes a shared information operation instruction resulting from logic operation processing of data packets in the first platform, returning a shared information operation instruction completion message to the first platform, meanwhile forwarding the shared information operation instruction to the second platform so as to complete the shared information operation on the second platform. Therefore, the first platform acquires data synchronously without waiting for feedback of the second platform.

8 Claims, 4 Drawing Sheets

METHOD AND APPARATUS FOR DATA LINKAGE BETWEEN HETEROGENEOUS PLATFORMS

FIELD OF THE INVENTION

The present invention relates to the field of data processing, and more particularly, to a method and apparatus for data linkage between heterogeneous platforms that is driven by an event.

BACKGROUND OF THE INVENTION

FPGAs, namely Field-programmable gate arrays, emerge as a kind of semi-custom circuits in application specific integrated circuits (ASICs), and are widely applied in various fields such as communication, data processing, network, instruments, industrial control, military and aviation due to their favorable performance and programmable ability as well as low power consumption and cost. However, FPGAs are typically not able to realize complex arithmetic logic in case of controlling costs.

In data processing, X86 architecture platforms have an advantage of strong extendibility, i.e., software running on X86 architecture platforms can support relatively complex arithmetic logics, but the arithmetic capability of X86 architecture platforms typically is not high, which limits their development to a high-end market.

In view of respective features of the above two heterogeneous platforms, an architecture system combining these two heterogeneous platforms, i.e., FPGA+X86 architecture system, has been proposed in prior art.

Figure 1:
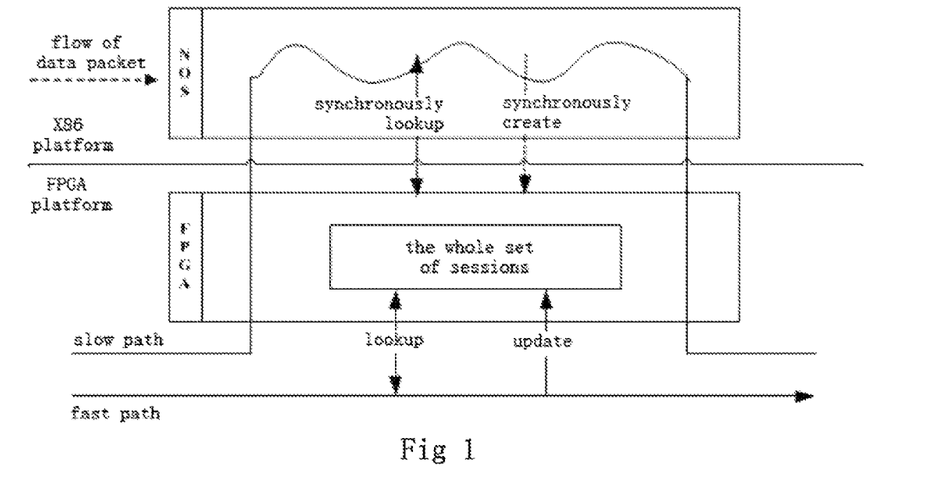
FIG. 1 shows a view illustrating data interaction in an architecture system combining X86/FPGA architecture platforms.

FIG. 1 shows a view illustrating data interaction between two heterogeneous platforms in a FPGA+X86 architecture system in prior art.

As shown in FIG. 1, in this architecture system, logical processing of X86 platform may proceed only after obtaining shared information, therefore data between the two heterogeneous platforms needs to be synchronized. The shared information is used by FPGA under most forwarding cases, and the fewer cross-platform information inquiries occur, the less influence on the overall performance. For this reason, data sets are usually stored on FPGA. In this case, FPGA does not know when X86 platform needs data, and thus most data acquisitions are initiated by X86 platform.

The synchronized data interaction process between existing X86 platform and FPGA is as follows: the X86 platform initiates an operation instruction via interrupt, FPGA responds to this operation instruction and executes it, and finally FPGA returns result of execution to X86 platform. Thereafter, X86 platform may proceed with processing of subsequent complex logics.

However, since the above process takes a long time, the performance of overall system is greatly consumed. Therefore, in a FPGA+X86 architecture system, it is a key technology and also a technology bottle neck for this system how to deal with synchronization of associated data between the two heterogeneous platforms with high efficiency to ensure consistency of shared data set in the two systems.

SUMMARY OF THE INVENTION

In view of the above, the object of the present invention is to provide a method and apparatus for data linkage driven by an event between heterogeneous platforms, which may be able to ensure that a first platform under X86 architecture (namely, a X86 architecture platform) synchronously acquires data without waiting for feedback of a second platform under FPGA architecture (namely, a FPGA architecture platform), thus reducing processing time of the first platform.

According to an aspect of the present invention, there is provided a method driven by an event for data linkage, used for data interaction between a first platform under a X86 architecture and a second platform under a FPGA architecture, the second platform storing shared information, the method being executed by a data linkage module in the first platform, and the data linkage module comprising a corresponding buffer for storing a shared information copy, the method comprising: determining which platform the received event is from, the first platform or the second platform; forwarding a data packet from the second platform to the first platform for logical operation processing when the received event is from the second platform; when the received event is information from the first platform that at least includes a shared information operation instruction resulting from logic operation processing of data packets in the first platform, returning a shared information operation instruction completion message to the first platform, and at the same time forwarding the shared information operation instruction to the second platform so as to complete the shared information operation on the second platform.

In one or more examples of the above aspect, said method may further comprise: after the second platform completes the shared information operation, the data linkage module performs synchronous processing on the shared information copy in the corresponding buffer of the first platform with a shared information operation result returned from the second platform.

In one or more examples of the above aspect, when the received event is from the second platform, forwarding the data packet from the second platform to the first platform for logical operation processing may comprise: when the received event is from the second platform, the data linkage module looks up whether there is a shared information copy for the data packet from the second platform in the corresponding buffer; when there is a shared information copy for the data packet from the second platform, the module updates the aging expiration time of the shared information copy and forwards the data packet to the first platform for logical operation processing, or when there is no shared information copy for the data packet from the second platform, forwarding the data packet to the first platform for logical operation processing.

In one or more examples of the above aspect, forwarding the data packet from the second platform to the first platform for logical operation processing when there is no shared information copy may comprise: when there is no shared information copy for the data packet from the second platform, inquiring whether the event received from the second platform contains a flag indicating there is shared information for the data packet in the whole set of shared information of the second platform; and when there is the flag indicating there is the shared information for the data packet in the whole set of shared information of the second platform in the received event, forwarding the data packet to the first platform for logical operation processing, and at the same time acquiring the shared information from the second platform and storing it into the corresponding buffer, or when there is no flag indicating there is the shared information for the packet in the whole set of shared information of the second platform in the received event, forwarding the data packet to the first platform for logical operation processing.

In one or more examples of the above aspect, the shared information operation instruction may comprise shared information creation, shared information update, shared information deletion and/or lookup of shared information copy associated with the event.

In one or more examples of the above aspect, the method may further comprise: traversing shared information copies in the corresponding buffer of the first platform and performing aging expiration processing on the shared information copies, wherein when the aging expiration time of a shared information copy expires, the shared information copy is deleted from the corresponding buffer.

In one or more examples of the above aspect, the shared information is a session table, a routing table, a permission table or a policy table.

According to another aspect of the present invention, there is provided a data linkage apparatus driven by an event for data interaction between a first platform under a X86 architecture and a second platform under a FPGA architecture. The second platform stores shared information, the data linkage apparatus comprising: a buffer for storing a shared information copy; a determination unit for determining which platform the received event is from, the first platform or the second platform; an event processing unit configured to forward a data packet from the second platform to the first platform for logical operation processing when the determination unit determines that the received event is from the second platform, or return a shared information operation instruction completion message to the first platform and at the same time forward the shared information operation instruction to the second platform to complete the shared information operation on the second platform when the received information is information from the first platform that at least includes a shared information operation instruction resulting from logic operation processing of data packets in the first platform.

In one or more examples of the above aspect, the data linkage apparatus may further comprise: a shared information copy synchronization unit configured to perform synchronous processing on the shared information copy in the buffer with a shared information operation result returned by the second platform after the second platform completes the shared information operation.

In one or more examples of the above aspect, the event processing unit may comprise: a shared information copy look up module configured to look up whether there is a shared information copy for the data packet from the second platform in the buffer when the received event is from the second platform; and an update module configured to update the aging expiration time of the shared information copy when there is a shared information copy for the data packet of the second platform.

In one or more examples of the above aspect, the event processing unit may comprise: a flag inquiry module configured to inquire whether the event received from the second platform contains a flag indicating there is shared information for the data packet in the whole set of shared information of the second platform; a shared information acquisition module configured to acquire the shared information from the second platform when the received event contains the flag indicating there is the shared information for the data packet in the whole set of shared information of the second platform; and a shared information storage module configured to store the acquired shared information in the buffer, wherein the event processing unit is further configured to forward the data packet from the second platform to the first platform for logic operation processing no matter whether the flag inquiry module finds the flag or not.

In one or more examples of the above aspect, the data linkage apparatus may further comprise: an aging expiration processing unit configured to traverse shared information copies in the buffer and perform aging expiration processing on the shared information copies, wherein when the aging expiration time of a shared information copy expires, the shared information copy is deleted from said buffer.

With the above-mentioned method and apparatus for data linkage driven by an event, by setting a data linkage module in a X86 architecture platform such that a shared information operation instruction completion message is returned to the X86 architecture platform and at the same time a shared information operation instruction (e.g., a session table operation instruction) resulting from logic operation processing of a data packet is forwarded to the FPGA architecture platform so as to complete corresponding shared information operation on the FPGA architecture platform when the shared information operation instruction is received from the X86 architecture platform, it can be ensured that the X86 architecture platform acquires data synchronously without waiting for feedback from the FPGA architecture platform, and thus processing time of the X86 architecture platform can be reduced.

To achieve the above described and related objects, one or more aspects of the present invention include features that will be described in detail hereinbelow and specifically defined in claims. The following description and accompanying drawings elaborate some illustrative aspects of the present invention. However, these aspects only illustrate some of the various ways in which the principle of the present invention may be applied. Furthermore, it is intended that the present invention comprises all these aspects and their equivalents.

BRIEF DESCRIPTION OF THE DRAWINGS

The above-mentioned and other objects, features and advantages of the present invention will become more apparent from the following detailed description made with reference to drawings. In the drawings.

Identical reference numerals indicate similar or corresponding features or functions throughout the figures.

DETAILED DESCRIPTION OF THE INVENTION

Aspects of the present disclosure will be described below. It should be appreciated that the teachings of the present invention may be embodied in various forms, and any specific structures, functions or both in the present disclosure are only representative. According to teachings of the present invention, those skilled in the field should understand that one aspect disclosed herein may be implemented independently of any other aspects, and two or more aspects of these aspects may be combined in various manners. For example, an apparatus may be realized or a method may be practiced according to any number of aspects described herein. In addition, the apparatus may be realized or the method may be practiced according to other structures, functions or structures and functions other than those in one or more aspects described herein or not being those in one or more aspects described herein. Furthermore, any aspect described herein may include at least one element of the claims.

Before describing embodiments of the present invention in detail, several concepts mentioned in the present invention will be explained first.

Term "shared information" means information used by both of the first platform (namely, X86 architecture platform) and the second platform (namely, FPGA architecture platform), which is generated according to data packets. In this embodiment, the shared information is a session table. In other embodiments of the present invention, the shared information may also be a routing table a permission table or a policy table.

Term "event" means the cause for triggering linkage of shared data, in this embodiment, the event is that the second platform transmits data packets to the first platform and the first platform transmits operation instructions for the shared information. An event may also be that the second platform can not access the shared information, and the first platform transmits operation instructions for the shared information.

Figure 2:
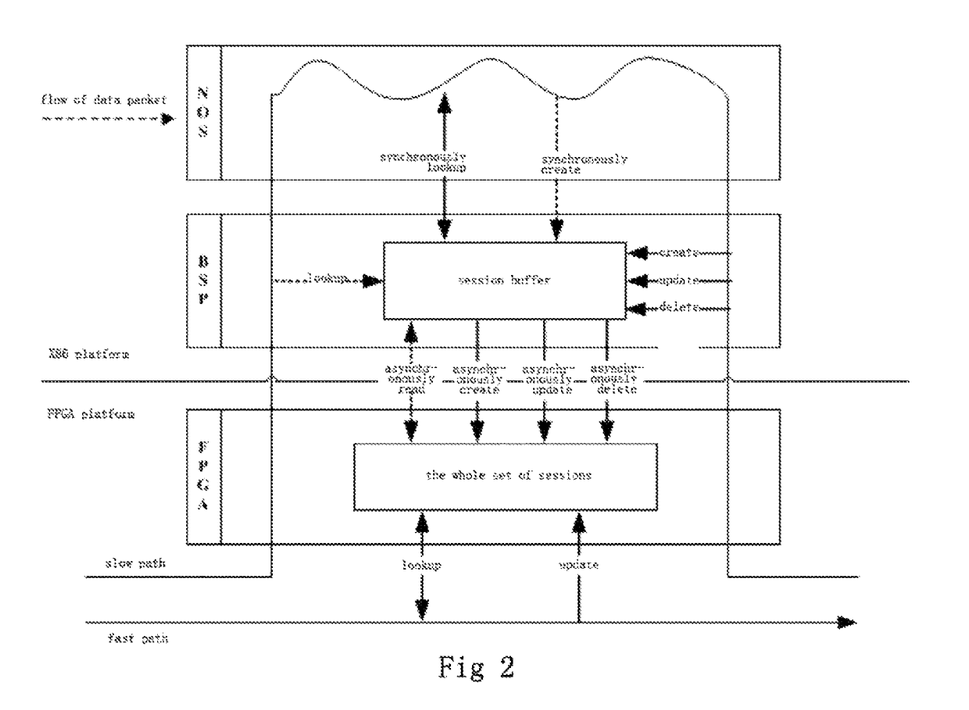
FIG. 2 shows a view illustrating data interaction in an architecture system combining X86/FPGA architecture platforms according to the present invention.

FIG. 2 shows a view illustrating data interaction triggered based on events in a X86+FPGA architecture system according to the present invention.

As shown in FIG. 2, in the X86+FPGA architecture platform according to the present invention, the first platform is an X86 architecture platform (namely, X86 system), and the second platform is an FPGA architecture platform (namely, FPGA). The whole set of the shared information is stored in the FPGA, and is a set of information used by both of the first platform and the second platform, which is generated according to data packets, and the shared information is a session table, a routing table, a permission table or a policy table, for example. The X86 system includes at least two modules, a data linkage module (also referred to as BSP herein) for executing linkage mechanism that is driven by an event between data ; and a software logic executing module (also referred to as NOS herein) for carrying out arithmetic logic analysis on data packets to be processed.

In the architecture shown in FIG. 2, when the FPGA receives a data packet, a lookup for the shared information (e.g., the session table) corresponding to the received data packet is made in the whole set of shared information (for example, a whole set of session table). When corresponding shared information is found in the whole set of shared information and the data packet need not be delivered to the NOS module in the X86 system for processing, the data packet is subject to a fast processing via a fast path.

When no corresponding shared information is found in the whole set of shared information, the received data packet is processed through interaction between the data linkage module and the software logic executing module via a slow path.

For some data packets, corresponding shared information is found in the whole set of shared information. However, when the topology configuration is changed or the data packet still needs to be delivered to the NOS module in X86 system for processing by analyzing contents in the shared information (such as item information in a session table), the received data packet is stilled processed through interaction with the data linkage module and the software logic executing module via a slow path.

Figure 3:
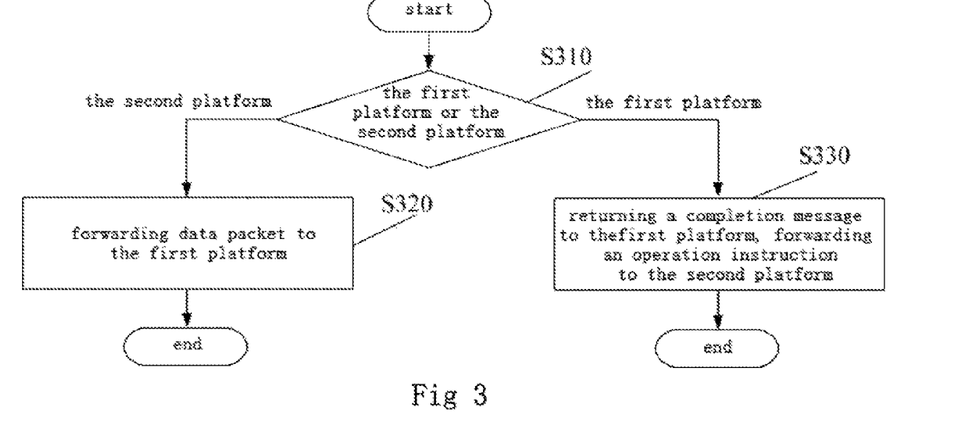
FIG. 3 shows a flow chart of an example of a method carried out by a data linkage module according to present invention.

FIG. 3 shows a flow chart of one example of a method executed by the data linkage module according to the present invention, which is a process executed by the data linkage module when processing is via a slow path. In this flow chart, the first platform is an X86 architecture platform and the second platform is a FPGA architecture platform.

As shown in FIG. 3, after the data linkage module received an event, in step S310, it determines which platform the received event is from, the FGPA architecture platform or the X86 architecture platform. That is, it determines which platform the event received by the data linkage module is from, the FPGA architecture platform or the X86 architecture platform that at least includes a shared information operation instruction resulting from logic operation processing of data packets in the X86 architecture platform, namely, the information from the software logic executing module.

When the received event is from the FPGA architecture platform, in step S320, the data packet is forwarded to the X86 architecture platform for logic operation processing, such as determining whether to perform shared information operation on the data packet. Here, the shared information operation may include shared information creation, shared information update, shared information deletion and/or shared information copy lookup of associated data packet, and when the shared information operation instruction is shared information creation, shared information update or shared information deletion, the event received from the X86 architecture platform further includes receiving the data packet. In this case, the data linkage module also forwards the data packet to the FPGA architecture platform. In one example of the present invention, the shared information may include a session table. In other embodiments of the present invention, the shared information may further include a routing table, a permission table or a policy table.

When the received information is information from the X86 architecture platform that at least includes a shared information operation instruction resulting from logic operation processing of data packets in the X86 architecture platform, in step S330, a shared information operation instruction completion message is returned to the X86 architecture platform, and the shared information operation instruction is forwarded to the FPGA architecture platform at the same time so as to complete the shared information operation on the FPGA architecture platform. In this case, when the X86 architecture platform (NOS module) receives the shared information operation instruction completion message returned from the data linkage module, it believes that the FPGA architecture platform has completed corresponding shared information operation, and thus start processing other data packets. At the same time, when the FPGA architecture platform receives the shared information operation instruction asynchronously forwarded by the data linkage module, the shared information operation may be asynchronously executed on the FPGA architecture platform.

Figure 4:
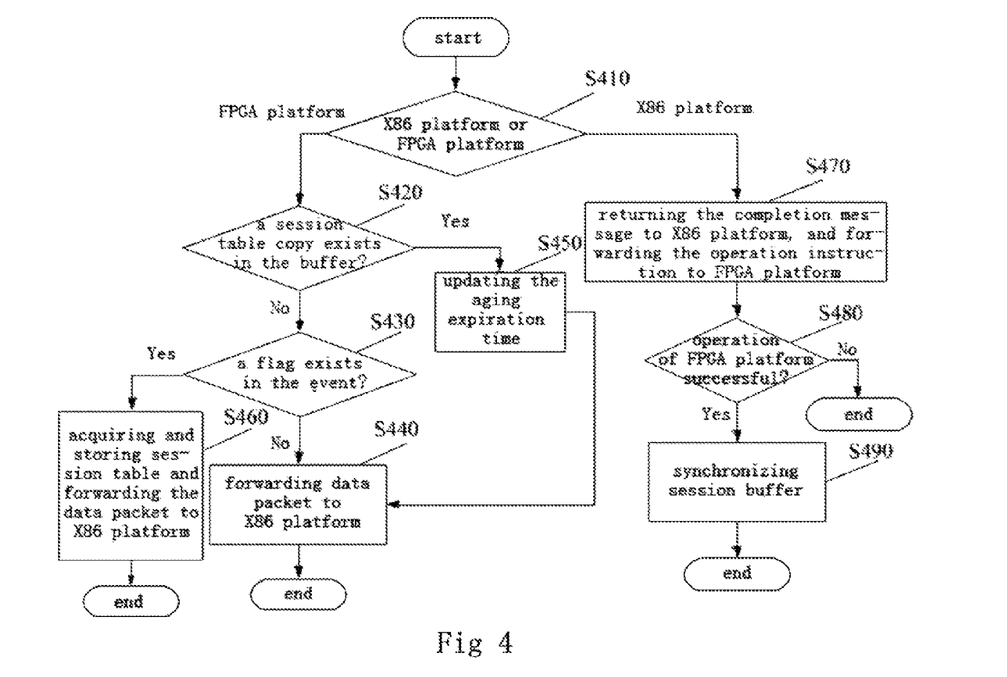
FIG. 4 shows a flow chart of another example of a method carried out by a data linkage module according to the present invention. In this example, a session table is used as shared information.

FIG. 4 shows a flow chart of another more preferred example of the method executed by the data linkage module according to the present invention, in which a session table is used as the shared information.

As shown in FIG. 4, after the data linkage module receives an event, in step S410, it determines which platform the received event is from, the FGPA architecture platform or the X86 architecture platform. That is, it determines which platform the event received by the data linkage module, the FPGA architecture platform or the X86 architecture platform that at least includes shared information operation instruction resulting from logic operation processing of data packets in the X86 architecture platform, namely, the information from the software logic executing module.

When the received event is from the FPGA architecture platform, in step S420, the data linkage module determines whether there is a session table copy of the data packet in the corresponding buffer of the data linkage module for storing session table copies. For example, when the data linkage module receives the data packet transmitted by the FPGA architecture platform, a lookup is made in the buffer of the session table copies for the session table copy corresponding to the data packet through quintuple information in the received data packet. The quintuple information includes source IP, source port, destination IP, destination port, protocol. It is well known in prior art how to look up in the buffer of the session table copies for the session table copy corresponding to the data packet according to the quintuple information, and no further description will be provided herein.

When there is a session table copy in the buffer of the session table copies, that is, the determination result in step S420 is Yes, in step S450, the aging expiration time of the session table copy is updated. The aging expiration time refers to the aging time (i.e., the effective time) of the session table copies. In other words, when the aging time of the session table copies expires, the session table copies become invalid.

After updating the aging expiration time as above, in step S440, the received data packet is forwarded to the X86 architecture platform for logical operation analysis, so as to determine whether to execute session table operation for the data packet. For example, the data packet is subject to logical operation analysis in the software logic executing module of the X86 architecture platform, so as to determine whether to execute session table update operation, session table deletion operation on the data packet or session table copy lookup operation on the associated data packet of the data packet.

When there is no session table copy in the corresponding buffer of the session table copies, i.e., the determination result in step S420 is No, in step S430, it is inquired whether there is a flag indicating there is the session table of the data packet in the whole set of session table of the FPGA architecture platform in the event received from the FPGA architecture platform (e.g., FPGA), that is, whether the event received from FPGA contains a "session on FPGA flag".

When there is a flag indicating there is a session table of the data packet in the whole set of session table of the FPGA architecture platform in the received event, in step S460, the data packet received from the FPGA architecture platform is forwarded to the X86 architecture platform for logical operation analysis so as to determine whether to execute session table operation on the data packet, and at the same time, the session table is acquired from the whole set of session table of the FPGA architecture platform and stored in the corresponding buffer of the session table copies in the data linkage module as the session table copy of the data packet. In this case, there is no association between the operation of forwarding the data packet received from the FPGA architecture platform to the X86 architecture platform for logical operation analysis processing and the operation of acquiring and storing the session table from the whole set of session table of the FPGA architecture platform, so both operations may be carried out synchronously or asynchronously.

When there is no flag indicating there is the session table of the data packet in the whole set of session table of the FPGA architecture platform in the event received from the FPGA architecture platform, the process proceeds to step S440. In step S440, the received data packet is forwarded to the X86 architecture platform for logical operation analysis processing so as to determine whether to execute session table operation on the data packet.

When the received event is information from the X86 architecture platform that at least includes a shared information operation instruction resulting from logic operation processing of data packets in the X86 architecture platform, in step S470, a session table operation instruction completion message is returned to the X86 architecture platform, and at the same time the session table operation instruction is forwarded to the FPGA architecture platform so as to complete the session table operation on the FPGA architecture platform. Here, the session table operation instruction may include session table creation instruction, session table update instruction, session table deletion instruction and/or session table copy lookup instruction of the associated data packet, and when the session table operation instruction is a session table creation, a session table update or a session table deletion, the information received from X86 architecture platform further includes the data packet, and the data linkage module further forwards the data packet to the FPGA architecture platform.

Particularly, when the software logic executing module (NOS module) decides to perform a session table creation operation through logical analysis on the received data packet, it transmits a session table creation instruction and forwards the received data packet to the data linkage module, thereby, the software logic executing module invokes the API for creating session table provided by the data linkage module to execute the creation action. After the data linkage module receives the session table creation instruction and data packet from the X86 architecture platform, the API of data linkage module immediately returns a session table creation completion message synchronously (when the session table has not been substantially created in the FPGA architecture platform), and at the same time forwards the session table creation instruction and the data packet to the FPGA architecture platform. After the software logic executing module obtains the session table creation completion message returned by the data linkage module, it will proceed with processing on other data packets. After the FPGA architecture platform receives the session table creation instruction and the data packet forwarded by the data linkage module, it executes the session table creation operation on the data packet asynchronously.

When the software logic executing module decides to perform session table update or deletion operation through logical analysis on the received data packet, it transmits a session table update or deletion instruction and forwards the received data packet to the data linkage module, thereby, the software logic executing module invokes an API for updating or deleting session table provided by the data linkage module to execute the session table update or deletion action. When the data linkage module receives the session table update or deletion instruction and the data packet from the X86 architecture platform, the API of data linkage module immediately synchronously returns a session table update or deletion completion message (when the FPGA architecture platform has not substantially updated or deleted the session table yet), and at the same time, forwards the session table update or deletion instruction and the data packet to the FPGA architecture platform. After the software logic executing module obtains the session table update or deletion completion message returned by the data linkage module, it will proceed with processing on other data packets. After the FPGA architecture platform receives the session table update or deletion instruction and the data packet forwarded by the data linkage module, it executes the session table update or deletion operation on the data packet asynchronously.

When the software logic executing module decides to perform session table copy lookup operation through logical analysis on the received data packet, it transmits a session table copy lookup operation instruction of the associated data packet, thereby, the software logic executing module invokes an API for session table lookup operation of associated packet provided by the data linkage module to execute the session table lookup operation of the associated data packet. When the data linkage module receives the session table lookup operation of associated data packet from the X86 architecture platform, the API of data linkage module looks up in the buffer of session table copy for the session table copy. When a session table copy of associated data packet is found, the found session table copy is returned to the software logic executing module. Otherwise, a lookup result that no session table copy is found is returned to the software logic executing module.

Next, in step S480, it is determined whether the session table operation of the FPGA architecture platform is successful. For example, the data linkage module determines whether the session table creation, session table update or session table deletion operation in the FPGA architecture platform is successful.

After the session table operation of the FPGA architecture platform is successful, the FPGA architecture platform returns a session table operation result to the data linkage module. Next, in step S490, the data linkage module performs synchronous processing on the corresponding buffer of the session table copies with the session table operation result received from the FPGA architecture platform. Here, the synchronous processing means that whatever operation the FPGA architecture platform conducts on the session table, the data linkage module also conducts corresponding operation on the session table copy.

If the operation by FPGA architecture platform fails, the processing of the data linkage module ends. For example, if the FPGA architecture platform fails to create a session table, then the data packet will be dropped. In this case, the data packet is retransmitted and the above-mentioned process is repeated for session table creation. If the FPGA architecture platform fails to update or delete a session table, the processing of the data linkage module ends.

The flow chart of another more preferred example of the method executed by the data linkage module of the present invention has been described above with reference to FIG. 4. It is to be noted here that the above-mentioned example is only a preferred embodiment of the present invention. In other examples of the present invention, various modifications may be made in the above-mentioned embodiments. For example, some of the steps in the above-mentioned embodiments may be omitted, such as the synchronous operation step. Alternatively, some new steps may be added in the above embodiments.

Figure 5:
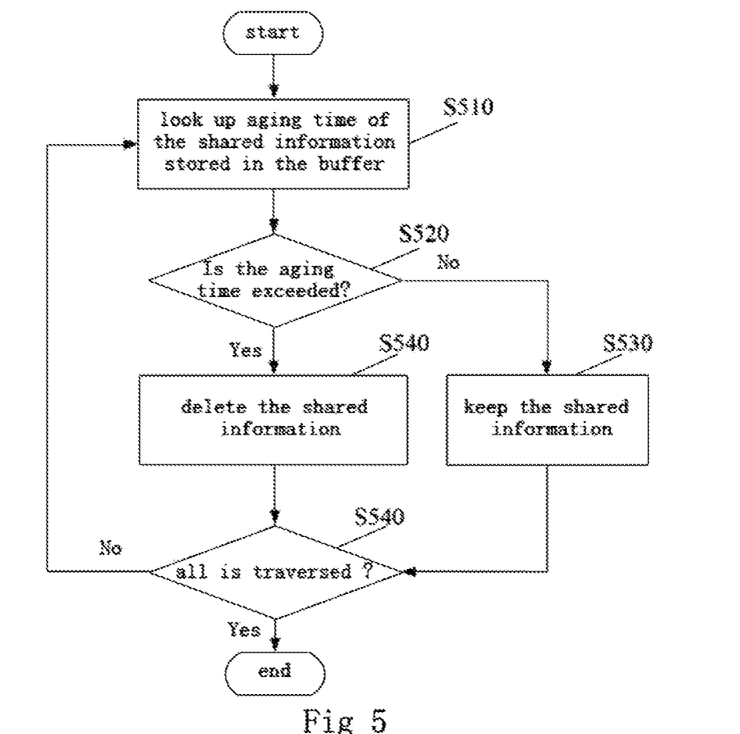
FIG. 5 shows a flow chart of aging expiration processing according to the present invention.

In another example of the present invention, the method executed by the data linkage module may further include aging expiration processing for the shared information. FIG. 5 shows a flow chart of aging expiration processing according to the present invention.

When the shared information exists in the corresponding buffer of the data linkage module for storing shared information, the data linkage module may also perform aging expiration processing on the shared information in the buffer.

As shown in FIG. 5, in step S510, the data linkage module looks up aging time of the shared information stored in the buffer. After the aging time of shared information is found, in step S520, it is determined whether the aging time is exceeded, namely, whether the aging time expires. For how to determine expiration of the aging time, refer to the above description.

When it is determined that the aging time does not expire, in step S530, the shared information is kept unchanged. When it is determined the aging time expires, in step S540, the shared information is deleted.

Next, in step S540, it is determined whether all shared information in the buffer is traversed. If not, the process returns to step S510 for looking up aging expiration time of a next piece of shared information and the above-mentioned operation process is repeated. If yes, the process ends.

The flow chart of the data linkage method driven by an event between heterogeneous platforms according to the present invention is described above with reference to FIGS. 2 to 5. The above data linkage method driven by an event between heterogeneous platforms of the present invention may be implemented in software, in hardware or combination of both.

Figure 6:
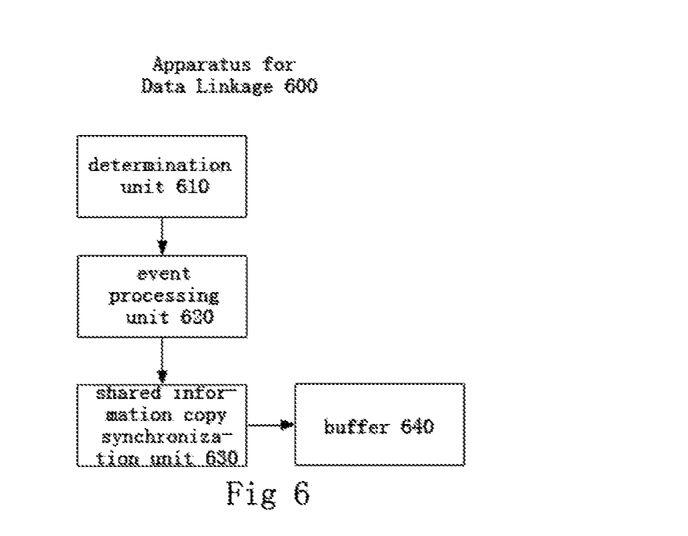
FIG. 6 shows a block diagram of the configuration of a data linkage apparatus according to the present invention.

FIG. 6 shows a block diagram of the configuration of the data linkage apparatus 600 according to the present invention. As shown in FIG. 6, the data linkage apparatus 600 includes a determination unit 610, an event processing unit 620, a shared information copy synchronization unit 630 and a buffer 640.

The buffer 640 is configured to store a copy of shared information generated according to a data packet (referred to as shared information copy hereinafter). The determination unit 610 is configured to determine which platform the received event is from, a first platform under the X86 architecture (namely X86 architecture platform) or a second platform under the FPGA architecture (namely FPGA architecture platform).

The event processing unit 620 is configured to forward the data packet to the first platform for logic operation processing when the determination unit determines the received event is from the second platform. When the received event is information from the first platform that at least includes a shared information operation instruction resulting from logic operation processing of data packets in the first platform, the unit returns a shared information operation instruction completion message to the first platform and at the same time forward the shared information operation instruction to the second platform so as to complete this shared information operation on the second platform.

The shared information copy synchronization unit 630 is configured to perform synchronous processing on the shared information copy in the buffer 640 with the shared information operation result returned by the second platform after the second platform completes the shared information operation.

In another example of the present invention, the data linkage apparatus 600 may not include the shared information copy synchronization unit 630.

Figure 7:
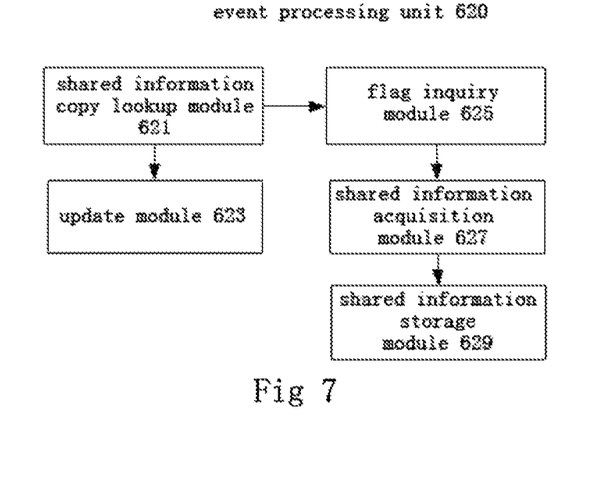
FIG. 7 shows a block diagram of the structure of one example of an event processing unit in FIG. 6

FIG. 7 shows a block diagram of the structure of an example of the event processing unit 620 in FIG. 6. As shown in FIG. 7, the event processing unit 620 includes a shared information copy lookup module 621 and an update module 623.

The shared information copy lookup module 621 is configured to look up whether there is a shared information copy for the data packet from the second platform in the buffer when the received event is from the second platform. The update module 623 is configured to update the aging expiration time of the shared information copy when there is the shared information copy.

The event processing unit 620 may further include a flag inquiry module 625, a shared information acquisition module 627 and a shared information storage module 629.

The flag inquiry module 625 is configured to inquire whether the event received from the second platform contains a flag indicating there is shared information for the data packet in the whole set of shared information of the second platform. The shared information acquisition module 627 is configured to acquire the shared information from the second platform when the event received from the second platform contains the flag indicating there is the shared information for the data packet in the whole set of shared information of the second platform. The shared information storage module 629 is configured to store the acquired shared information in the buffer. In this case, the event processing unit 620 may be further configured to forward the data packet from the second platform to the first platform for logic operation processing, no matter whether a flag indicating there is the shared information for the packet in the whole set of shared information of the second platform is found in the event received from the second platform.

In another example of the present invention, the event processing unit 620 may not include the flag inquiry module 625, the shared information acquisition module 627 and the shared information storage module 629, and only include the shared information copy lookup module 621 and the update module 623.

In another example of the present invention, the data linkage apparatus 600 may further include an aging expiration processing unit (not shown) for traversing shared information copies in the buffer and performing aging expiration processing on the shared information copies, wherein a shared information copy is deleted from the buffer when the aging expiration time of the shared information copy is exceeded.

Figure 8:
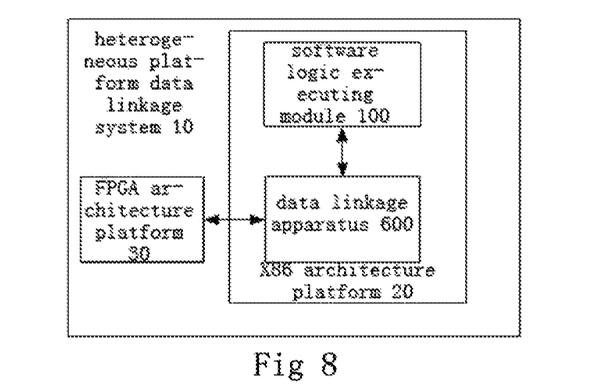
FIG. 8 shows a block diagram of a heterogeneous platform data linkage system according to the present invention.

FIG. 8 shows a block diagram of the software and hardware data linkage system 10 according to the present invention. As shown in FIG. 8, the software and hardware data linkage system 10 includes an X86 architecture platform 20 and a FPGA architecture platform 30. The X86 architecture platform 20 includes a software logic executing module 100 and a data linkage apparatus 600.

With the above-mentioned method and apparatus driven by an event for data linkage between heterogeneous platforms, by setting a data linkage module in a X86 architecture platform, X86 architecture platform sends a shared information operation instruction (e.g., a session table operation instruction) resulting from logic operation processing of a data packet to the data linkage module and the data linkage module returns a shared information operation instruction completion message to the X86 architecture platform and at the same time forwards a shared information operation instruction to the FPGA architecture platform so as to complete corresponding shared information operation on the FPGA architecture platform, it can be ensured that the X86 architecture platform acquires data synchronously without waiting for feedback from the FPGA architecture platform, and thus processing time of the X86 architecture platform can be reduced.

While the above disclosure shows illustrative embodiments of the present invention, it should be noted that various changes and modifications may be made without departing from the scope of the present invention as defined in claims. Functions, steps and/or actions of the method claims according to the inventive embodiments described herein are not necessarily executed in any specific order. Furthermore, while elements of the present invention may be described or claimed in singular form, it is also possible to conceive multiple of them, unless they are limited to singular specifically.

While embodiments according to the present invention have been described above with reference to drawings, those skilled in the field should appreciate that various modifications may be made to embodiments provided in the above-mentioned present invention without departing from the spirit of the present invention. Therefore, the scope of the present invention should be defined by contents of the appended claims.

What is claimed is:

1. A method for data linkage driven by an event, used for data interaction between a first platform under a X86 architecture and a second platform under a field programmable gate array (FPGA) architecture, the second platform storing shared information, the method being executed by a data linkage module in the first platform, and the data linkage module comprising a corresponding buffer for storing a shared information copy, the method comprising:

determining which platform the received event is from, the first platform or the second platform;

forwarding a data packet from the second platform to the first platform for logical operation processing when the received event is from the second platform;

when the received event is information from the first platform that at least includes a shared information operation instruction resulting from logic operation processing of data packets in the first platform, returning a shared information operation instruction completion message to the first platform, and at the same time forwarding the shared information operation instruction to the second platform so as to complete the shared information operation on the second platform, wherein forwarding a packet from the second platform to the first platform for logical operation processing when the received event is from the second platform comprises:

when the received event is from the second platform, looking up whether there is a shared information copy for the data packet from the second platform in the corresponding buffer;

when there is a shared information copy for the data packet from the second platform, updating an aging expiration time of the shared information copy and forwarding the data packet to the first platform for logical operation processing, or when there is no shared information copy for the data packet from the second platform, forwarding the data packet to the first platform for logical operation processing, wherein forwarding the data packet from the second platform to the first platform for logical operation processing when there is no shared information copy comprises:

when there is no shared information copy for the data packet from the second platform, inquiring whether the event received from the second platform contains a flag indicating there is shared information for the data packet in the whole set of shared information of the second platform; and when there is the flag indicating there is the shared information for the data packet in the whole set of shared information of the second platform in the received event, forwarding the data packet to the first platform for logical operation processing, and at the same time acquiring the shared information from the second platform and storing it into the corresponding buffer, or when there is no flag indicating there is the shared information for the packet in the whole set of shared information of the second platform in the received event, forwarding the data packet to the first platform for logical operation processing.

2. The method of claim 1, further comprises: after the second platform completes the shared information operation, performing synchronous processing on the shared information copy in the corresponding buffer of the first platform with a shared information operation result returned from the second platform.

3. The method of claim 1, wherein the shared information operation instruction comprises shared information creation, shared information update, shared information deletion and/or lookup of shared information copy associated with the event.

4. The method of claim 1, further comprises:
traversing shared information copies in the corresponding buffer of the first platform and performing aging expiration processing on the shared information copy,
wherein when the aging time of the shared information copy expires, the shared information copy is deleted from the corresponding buffer.

5. The method of claim 1, wherein the shared information is a session table, a routing table, a permission table or a policy table.

6. A data linkage apparatus driven by an event for data interaction between a first platform under a X86 architecture and a second platform under a field programmable gate array (FPGA) architecture, and the second platform storing shared information, the data linkage apparatus being included in the first platform, wherein the data linkage apparatus comprises:
a buffer for storing a shared information copy; and
a memory with instructions stored therein, the instructions being executable by the first platform and, when being executed, being configured to perform operations of:
determining which platform the received event is from, the first platform or the second platform;
forwarding a data packet from the second platform to the first platform for logic operation processing when the received event is from the second platform, or
returning a shared information operation instruction completion message to the first platform and at the same time forwarding the shared information operation instruction to the second platform to complete the shared information operation on the second platform when the received information is information from the first platform that at least includes a shared information operation instruction resulting from logic operation processing of data packets in the first platform,
wherein the instructions being configured to further perform operations of:
looking up whether there is a shared information copy for the data packet from the second platform in the buffer when the received event is from the second platform; and
updating the aging expiration time of the shared information copy when there is a shared information copy for the data packet of the second platform,
wherein the instructions being configured to further perform operations of:
inquiring whether the event received from the second platform contains a flag indicating there is shared information for the data packet in the whole set of shared information of the second platform;
acquiring the shared information from the second platform when the received event contains the flag indicating there is the shared information for the data packet in the whole set of shared information of the second platform;
storing the acquired shared information in the buffer, and
forwarding the data packet from the second platform to the first platform for logic operation processing no matter whether the flag inquiry module finds the flag or not.

7. The data linkage apparatus of claim 6, the instructions being configured to further perform an operation of:
performing synchronous processing on the shared information copy in the buffer with a shared information operation result returned by the second platform after the second platform completes the shared information operation.

8. The data linkage apparatus of claim 6, the instructions being configured to further perform an operation of:
traversing shared information copies in the buffer and performing aging expiration processing on the shared information copies,
wherein when the aging time of a shared information copy expires, the shared information copy is deleted from said buffer.

* * * * *